Figure 1:
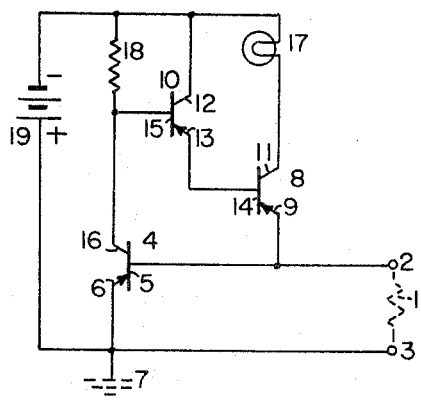

Nov. 1, 1966  D. R. PROCTOR ETAL  3,283,244
ELECTRICAL RESISTANCE TESTER
Original Filed May 15, 1963

INVENTORS
DONALD R. PROCTOR
DONALD E. SWEET
BY
Harry R. Lubcke
AGENT

United States Patent Office 3,283,244
Patented Nov. 1, 1966

3,283,244
ELECTRICAL RESISTANCE TESTER
Donald R. Proctor, Santa Ana, and Donald E. Sweet, Anaheim, Calif., assignors to Electronic Engineering Company of California, Santa Ana, Calif., a corporation of California
Original application May 15, 1963, Ser. No. 280,583, now Patent No. 3,259,841, dated July 5, 1966. Divided and this application Jan. 17, 1966, Ser. No. 529,906
7 Claims. (Cl. 324—62)

This application is a division of our co-pending application entitled, "Negative-Feedback Transistorized Electrical Continuity Tester," filed May 15, 1963, Serial No. 280,583, and now Patent No. 3,259,841.

Our invention is concerned with a means for indicating electrical continuity and particularly with such a device having novel characteristics.

The ordinary "continuity tester" consists of a buzzer or a lamp in series with a battery and a pair of leads to make connection to the circuit to be tested for continuity. Such a tester is suitable for ordinary determination of the continuity of electrical conduction of wiring or of simple electrical devices.

However, even some simple electrical devices now include transistors, and bitter experience in the factory and in servicing has taught that even testing for continuity of the conduction of wiring may destroy the transistors or semiconductor diodes because of voltage "spikes" or excessive currents. This is particularly true with the direct current buzzer type tester, since the inductive characteristic of the buzzer coil together with the making and breaking of the contact invariably causes extreme voltage transients. Even an alternating current buzzer can cause high transient voltages upon the operator breaking the circuit at the end of the test.

It is as necessary to check-out modern circuits employing transistors and other semiconductor devices as it has been to check-out circuits in the past. We have fulfilled this present need in an entirely new way in which the indicating device is part of a negative feedback amplifier circuit.

Our tester has an additional advantage in that the voltage reaching the circuit tested is clamped at a very low value. Also, unlike many other testers, our device does not indicate continuity except for very low values of resistance; i.e., typically less than one ohm. Below this rather vernier indication of resistance value the indicator lamp burns brightly and for substantially zero resistance the current through the resistance being tested changes from a small value to a relatively large value. However, the voltage developed across this resistance continues to be held to a low value, one that is harmless to transistors and diodes. The relatively large value of current mentioned is useful to "burn through" an electrical connection if the same exists, or to cause the same to open-circuit if the connection is merely a slight conductive filament.

While our tester can be embodied to indicate various ranges of resistance it is principally embodied to indicate a resistance of a few ohms, or even a fraction of an ohm, as a maximum and substantially zero ohms as the continuity indication.

An object of our invention is to provide an electrical resistance tester having operating characteristics consonant with the limitations of circuits employing semiconductor devices.

Another object is to provide an electrical resistance tester which does not develop output voltage spikes at any time.

Another object is to provide means for indicating the existence of a conductive path, which means impresses only a low voltage upon the elements within that path and allows only a low current to flow when that path contains appreciable resistance.

Another object is to provide an electrical tester which causes a moderate current to flow at low voltage when the resistance of the conductive path approaches zero.

Other objects will become apparent upon reading the following detailed specification and upon examining the accompanying drawings, in which are set forth by way of illustration and example certain embodiments of our invention.

Figure 3:
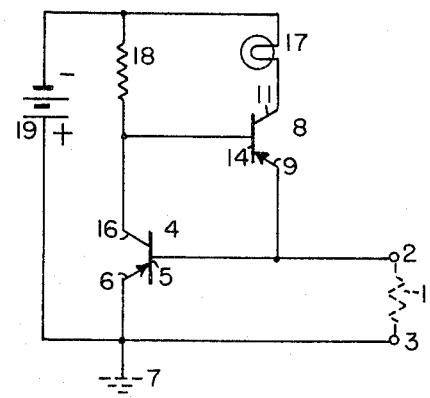
Figure 2:
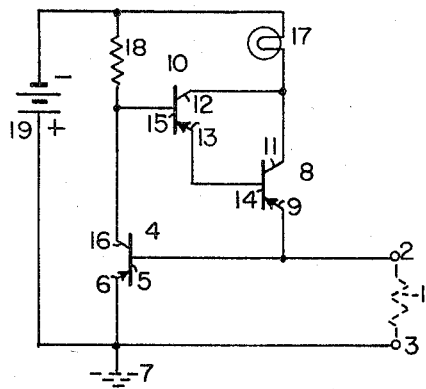
Figure 4:
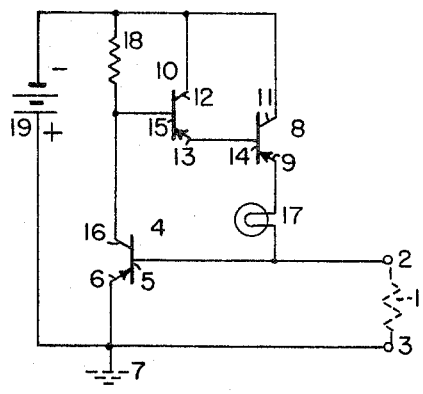

FIG. 1 shows a typical embodiment of our invention,
FIG. 2 shows the same in which the Darlington amplifier type of connection is employed,
FIG. 3 shows a simplified embodiment of our invention, and
FIG. 4 shows an alternate embodiment of FIG. 1.

In FIG. 1 numeral 1 indicates the resistor or the resistance of the circuit being measured. This has been shown as a dotted resistor, but may be almost any kind of electrical device or element, the resistive component of which is of interest. Terminals 2 and 3 are provided for connecting the element to be measured and these terminals may also include flexible wire leads as is often employed in practice.

Terminal 2 connects to base 5 of transistor 4. Terminal 3 connects to emitter 6 of transistor 4 and may also connect to ground 7, if this is desired in any embodiment. Terminal 2 also connects to emitter 9 of emitter-follower transistor 8.

Transistors 4 and 8 are connected in conjunction with a third transistor 10 in a negative feedback configuration. Therein, collector 11 of transistor 8 is connected to collector 12 of transistor 10 through lamp 17. Emitter 13 of transistor 10 is connected to base 14 of transistor 8. Base 15 of transistor 10 connects to collector 16 of transistor 4.

Lamp 17 is also connected to resistor 18, which resistor is also connected to the junction between base 15 and collector 16. The circuit is powered from battery 19. This is typically connected with the negative terminal to resistor 18, collector 12 of transistor 10, and lamp 17 and with the positive terminal to emitter 6 of transistor 4, and to terminal 3.

In a typical embodiment all of the transistors may be of the PNP or of the NPN types of the usual low power level capability, such as the N293 or the 2N1304 designations, respectively. For the NPN type the polarity of battery 19 is reversed.

Lamp 17 is typically an easily available low voltage type; such as the #222 penlight incandescent lamp of the General Electric Co., which has an operating voltage of 2.2 volts and an operating current of 250 milliamperes. Resistor 18 has a resistance value of approximately five thousand ohms for an embodiment which indicates from approximately 0.8 ohm to 0.5 ohm. That is, for any resistance value higher than 0.8 ohm lamp 17 remains dark. Within the raneg of resistance from 0.8 ohm to 0.5 ohm the lamp becomes progressively brighter. For any resistance less than 0.5 ohm the lamp burns brightly. For a #49 lamp, having a different operating current from the #222 lamp, the corresponding range for analogue indication is from 3.3 to 2.0 ohms.

The performance of our circuit has been found to be relatively independent of the beta of the transistors employed as long as a certain minimum amplifier loop gain exists. It is desirable that the transistors employed have a low base turn-on characteristic. This requirement is easily met by the usual alloy junction transistors.

The voltage across terminals 2 and 3 of the tester is clamped at approximately 120 millivolts by the action of the forward biased base-emitter diode of transistor 4. The current through battery 19 is approximately one milliampere when lamp 17 is not lighted and 250 milliamperes when it is fully lighted. The current through resistance 1, being tested, varies from essentially zero to 250 milliamperes, depending upon the value of that resistance, as has been explained.

Continuing to refer to FIG. 1, our circuit tester operates in the following manner. Assume that resistance 1 is large, an open circuit. Then the leakage current of transistors 8 and 10 is furnished through the emitter-base path of transistor 4. This current serves as a signal for transistor 4. This keeps it in a saturated condition, holding the collector voltage to a low value and thus applying reverse bias to the base of transistor 10. Accordingly, transistors 10 and 8 are held in cut-off condition and so no current flows through lamp 17. Assume now that resistor 1 is reduced in value. It now carries a proportionate share of the leakage current, until at some low value that is not sufficient to maintain a necessary minimum value of current flow in the base-emitter circuit of transistor 4, this transistor becomes unsaturated. The collector 16 voltage then rises and supplies a signal current to base 15 of transistor 10. This current is amplified by transistor action in this transistor and is supplied as a signal to transistor 8. The increased emitter current of transistor 8 is shared, as before, by resistor 1 and the base of transistor 4, thus tending to keep transistor 4 in the saturated condition. A negative feedback path therefore exists between the emitter of transistor 8 and the base of transistor 4. As the resistance at 1 is lowered further a value is reached at which the major portion of the current from the emitter of transisor 8 flows through resistance 1 and essentially no current flows into the base 5 of transistor 4. At this point the collector 16 voltage of transistor 4 rises to provide a sufficient signal at base 15 of transistor 10, such that the current, when amplified by transistor 10, supplies sufficient base 14 drive to transistor 8 to turn it on. This lights lamp 17. The negative feedback acts to reduce the value of resistance 1 at which lamp 17 is turned on. This explanation has been set forth as function of decreasing resistance value for resistance 1. However, if a short or a low value of resistance is connected between terminals 2 and 3 our tester circuit responds at once to that value of resistance.

Certain alternate embodiments of our invention are possible.

For one, the emitter-follower transistor 10 is connected according to a Darlington amplifier circuit. This modification is shown in FIG. 2. In this, collector 12 of transistor 10 is connected directly to collector 11 of transistor 8. The operation of the tester of FIG. 2 is essentially the same as has been described in connection with the operation of the tester of FIG. 1. The advantage of the configuration of FIG. 2 is a simplification of the structure of the tester as a piece of apparatus.

The allowability of substituting NPN transistors for the PNP transistors shown in FIGS. 1 and 2 has been considered as a matter of structure above. The mode of operation of the tester with either type is the same.

It should be mentioned that the function of transistor 10 is to provide current gain. By the use of sufficiently high gain transistors, 8 and 10 may become one, represented as transistor 8, and the operation of the tester remains the same.

Such a two-transistor tester is shown in FIG. 3. The several identifying numerals in this figure have the same significance as they had in FIGS. 1 and 2. The modification is characterized by the connection of base 14 of transistor 8 directly to collector 16 of transistor 4. Transistor 10 being absent, the connection of the collector thereof to lamp 17 is also absent.

A still further modification within the scope of our invention is shown in FIG. 4. This is the circuit of FIG. 1 with lamp 17 placed in the lead between emitter 9 of transistor 8 and terminal 2, rather than being in the collector 11 lead of transistor 8. Since transistor 8 is an emitter-follower the voltage at its base 14 must be essentially equal to the full voltage of battery 19 in order to obtain a satisfactory indication. This requires that resistor 18 have a lower resistance value than in FIG. 1 and the battery drain in the non-indicating or standby condition is higher than it is in FIG. 1.

It is presently possible to combine transistors 10 and 8, or even all three transistors on one semiconductor wafer according to integrated circuit technique. Such a combination does not affect the fundamental operation of the device.

Although specific examples of voltages and currents and values for the several circuit elements have been given these are for illustration only and modifications thereof may be made without departing from the scope of our invention. Modification of circuit connection details and minor alteration of the coactive relation between elements may similarly be made under the invention.

Having thus fully described our invention and the manner in which it is to be practiced, we claim:

1. A circuit for indicating the value of an electrical resistance comprising
    (a) a first transistor having input and output electrodes,
        said input electrodes of said first transistor connected directly across said electrical resistance,
    (b) a second transistor having input and output electrodes,
        an input electrode of said second transistor connected to an output electrode of said first transistor, and
        an other input electrode of said second transistor connected to said electrical resistance to form a negative feedabck loop comprised of said first transistor, said second transistor and said electrical resistance,
    (c) a resistor,
    (d) an incandescent lamp,
        said resistor connected to the said output electrode of said first transistor, and to the output electrode of said second transistor, thereby to be included within said feedback loop,
    (e) means to power said circuit connected to said electrical resistance and to said resistor to allow current to flow through both under the control of said first and second transistors, and
        said lamp connected in said feedback loop with one terminal of said lamp directly connected to an electrode of said second transistor,
        said circuit thus constituted to indicate the value of an electrical resistance by providing an indication by non-illumination of said lamp for values of said electrical resistance greater than the order of one ohm,
        and by providing an indication by illumination of said lamp for values of said electrical resistance less than the order of one ohm,
        the current through said electrical resistance limited by the resistance of said lamp, and
        the voltage across said electrical resistance limited by the forward voltage drop of the transistor junction of said input electrodes of said first transistor.

2. The circuit for indicating the value of an electrical resistance of claim 1, in which
    (a) said electrode of said second transistor is an output electrode thereof, and
    (b) said lamp is also connected to said resistor.

3. The circuit for indicating the value of an electrical resistance of claim 1, in which
    (a) said electrode of said second transistor is said other input electrode thereof,
    (b) said lamp is also connected to said electrical resistance, and
    (c) said second transistor is comprised of a Darlington pair.

4. The circuit for indicating the value of an electrical resistance of claim 1, in which
   (a) each of said transistors is composed of a material having a low base turn-on characteristic.

5. The circuit for indicating the value of an electrical resistance of claim 1, in which
   (a) each of said transistors is composed of germanium semiconductor material.

6. The circuit for indicating the value of an electrical resistance of claim 1, in which
   (a) each of said transistors is of the same conductivity type.

7. The circuit for indicating the value of an electrical resistance of claim 1, in which
   (a) said input electrodes of said first transistor are base and emitter electrodes and said output electrode of said first transistor is a collector electrode, and
   (b) said input electrode of said second transistor is a base electrode and said other input electrode is an emitter electrode.

No references cited.

WALTER L. CARLSON, *Primary Examiner.*

E. E. KUBASIEWICZ, *Assistant Examiner.*